May 29, 1962   P. J. HARINGHUIZEN   3,036,439
PURIFICATION OF A GAS BY REMOVING ONE OR MORE ADMIXED
IMPURITIES FROM IT BY CONDENSING THE IMPURITY
OR IMPURITIES TO THE SOLID STATE
Filed Oct. 20, 1958   5 Sheets-Sheet 1

Inventor
Pieter J. Haringhuizen
By Cushman, Darby & Cushman
Attorneys

United States Patent Office 3,036,439
Patented May 29, 1962

3,036,439
PURIFICATION OF A GAS BY REMOVING ONE OR MORE ADMIXED IMPURITIES FROM IT BY CONDENSING THE IMPURITY OR IMPURITIES TO THE SOLID STATE
Pieter J. Haringhuizen, Geleen, Netherlands, assignor to Stamicarbon N.V., Heerlen, Netherlands
Filed Oct. 20, 1958, Ser. No. 768,213
Claims priority, application Netherlands Mar. 28, 1956
2 Claims. (Cl. 62—13)

This invention relates to the purification of a gas by removing one or more admixed impurities from it by condensing the impurity or impurities to the solid state. The present application is a continuation-in-part of application Serial No. 649,069 filed March 28, 1957, and now abandoned and is also an improvement of the invention described and claimed in copending application Serial No. 537,070, filed September 27, 1955, now Patent 2,960,836. The entire disclosure of which is hereby incorporated by reference.

The present invention is particularly but not exclusively concerned with the purification of hydrogen by the removal of residual impurities such as nitrogen and carbon monoxide preparatory to a distillation process, e.g. for recovering deuterium.

The present invention is directed to modified purification systems employing only two heat-exchanging regenerators.

According to the invention, a gas which is to be purified is continuously flowed first through one and then through the other alternately of two reversible heat exchanging regenerators. A cold flushing gas is flowed through the regenerators in the reverse direction. In this way each regenerator is alternately traversed by impure gas and by flushing gas. Simultaneously, a gas colder than the impure gas and a gas warmer than the flushing gas are flowed through the regenerator in heat exchange relation so that the stream of the colder gas will cause deposition in the solid state of impurities in the gas to be purified while the stream of warmer gas causes the impurities to be evaporated and removed by the flushing gas. According to the process, the average temperature at any place in the regenerator during evaporation is higher than the average temperature at that place during deposition.

Referring to the drawings, FIGURES 1a, 1b, 2a, 2b, 5 and 6 diagrammatically illustrate the flow of gases in the regenerators operating according to the invention.

The required temperature pattern according to the invention may be effected by arranging for a variable supply of the cooling gas and of the warming gas in heat exchange with the impure and flushing gas currents during the course of the successive deposition and evaporation stages, and the balance of the colder and warmer gases available at times when less than the full available quantities are passing in counter-current with the impure and flushing gas currents may be passed in heat exchange relation through a heat exchanger or the balance of the colder gas may be used to modify the temperature variation in the regenerator in which flushing is proceeding and the balance of the warmer gas to modify the temperature variation in the generator in which deposition is proceeding, or the full available quantities of the colder and warmer gases may be variably distributed during the cycle as between a heat exchanger and both regenerators.

According to the invention there can be simultaneously removed, one, two, three or even more impurities. Thus for example in the purification of hydrogen from which the major portion of the impurities have been removed by cooling to a temperature lower than the condensation temperature but higher than the melting point of the impurities, the residual $N_2$ and CO may be simultaneously removed.

It will be understood that where the temperature in a regenerator is to be influenced by supplying a varying amount of a particular gas, the specific heat of the gas is an influential factor in determining the amount or weight of the gas which must be supplied in a given time to produce a given effect. Where in the following description the quantities of two gases have to be compared from the point of view of their thermal capacities, the quantities will be simply referred to as "heat quantities." It may be observed that in actual practice the specific heat of a gas is dependent not only on its pressure but also on its temperature and should this phenomenon occur, it may be rendered nugatory by applying the principle known as "unbalanced flow."

In operating the systems according to the invention the flow distribution over the various gas streams will of course be controlled so that the whole system is in thermal equilibrium, i.e., so that the total amount of heat supplied by impure gas and the warming gas per cycle in each regenerator corresponds with the quantity of cold supplied by the flushing gas and the cooling gas, losses due to radiation etc., being taken into account, thereby ensuring restoration of a given temperature level between cycles. If necessary a separate circuit can be employed for compensating for temperature differences, but such expedients, known in themselves, will not be referred to in the description. In general in the examples the heat quantities of the impure and flushing gases traversing the system per cycle is practically equal, but this is not necessarily so, and in practice, the heat quantity of the flushing gas will often be smaller than that of the gas to be purified.

In those examples wherein gases flow through auxiliary heat exchanger C they always leave it with practically the same temperature. This is achieved by using for C a normal exchanger (having a low intrinsic heat capacity) and taking care that the amount of gases flowing counter currently therein always have the same total heat capacity per unit of time, or, if this is not possible, by using a heat exchanging element with a high intrinsic heat capacity so that in the period that the gases are not in equilibrium the temperature of exchanger C can change only slightly.

An essential feature of the invention is the use of two heat exchanging regenerators A and B, being heat regenerators provided with pipe systems for the flow of one or more gases in heat exchanging relation with the gas flowing through the body of the regenerator. The heat exchanging regenerators are reversing heat exchangers having a high intrinsic heat capacity. This high intrinsic heat capacity can be obtained by filling the shell of the heat exchanger with material having a high specific heat capacity e.g. lead. Through these heat exchanging regenerators two gases always are led flowing counter-currently. Measured over a complete cycle the two gases must have the same total heat capacity. By varying the amount of flow of at least one of the gases flowing counter-currently the equilibrium in the heat regenerator is disturbed in such a way that in the mean the temperature in each point of the regenerator is higher during the purging period than during the cooling period. Always the over capacity of a gas during a part of the cycle is compensated by an under capacity during another part of the cycle. Due to the high intrinsic heat capacity of the exchanger the temperature rises and falls slowly and which is essential by approximately the same amount of degrees throughout the length of the heat exchanging element.

Figure 8:
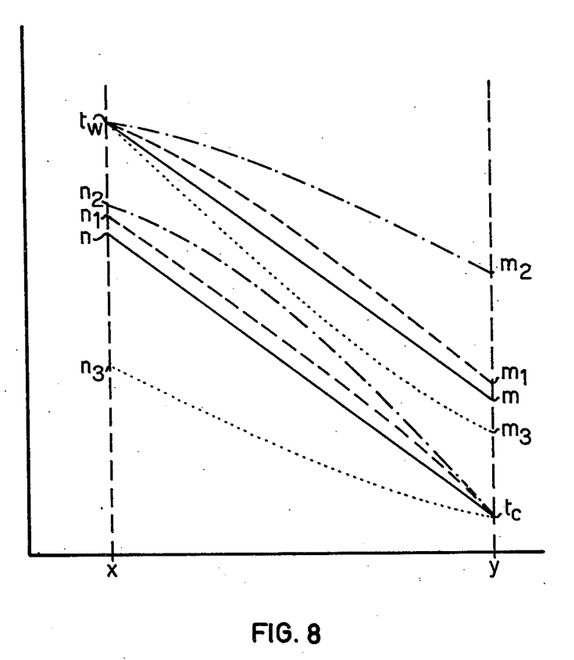
FIGURE 8 is a graph of the temperature plotted against the distance of a point along the passage through the heat exchanger.

Referring more specifically to the drawings, FIGURE 8 is a graph in which the temperature $t$ is plotted against the distance of a point along the passage through the heat exchanger from one end of the exchanger.

X is the warm end and Y the cold end of the exchanger. $t_w$ and $t_c$ respectively are the temperature of the warm and the cold gas entering the exchanger. In the equilibrium state the two gases, flowing counter-currently, have the same total heat capacity—i.e. the amount of gas per unit of time multiplied by its specific heat. The curves of the temperature are straight lines $m$ and $n$.

In the event that the heat exchanger has a high intrinsic heat capacity a variation in the quantity of one of the gases gives a shift of the temperature lines approximately parallel to itself, provided that the time of this disturbance is not too long. (Curves $m_1$ and $n_1$.) If the intrinsic heat capacity of the heat exchanger is relatively small as is customery with normal heat exchangers then the same disturbance will give in the same time temperature lines as $m_2$ and $n_2$. (It will be understood that these lines $m_2$ and $n_2$ will be reached with an exchanger with a high intrinsic heat capacity after a very long time.)

In FIGURE 8 it will be observed that the temperature variation at the cold side of the exchanger is much bigger than at the warm side of the exchanger if the warm gas is in excess. If the balance is restored the lines $m_2$ and $n_2$ fall back to $m$ and $n$ in a short time if the intrinsic heat capacity of the heat exchanger is small.

If the intrinsic heat capacity is large the lines $m$ and $n$ will only be reached after a very long time. Here it is necessary to disturb the equilibrium to the other side by varying the amount of gases in such a way that when in the first period an excess of a gas is used in the second period this gas will be deficient.

If this is done with a heat exchanger with a small intrinisc heat capacity curves $m_2$ and $n_2$ rapidly shift to curves as $m_3$ and $n_3$. In such case it is not possible to speak of a regular variation of temperature throughout the length of the exchanger.

Much refrigeration energy is lost in order to achieve the temperature shift. This is quite serious in the low temperature region beneath 63° K., the freezing point of the nitrogen.

Figure 9:
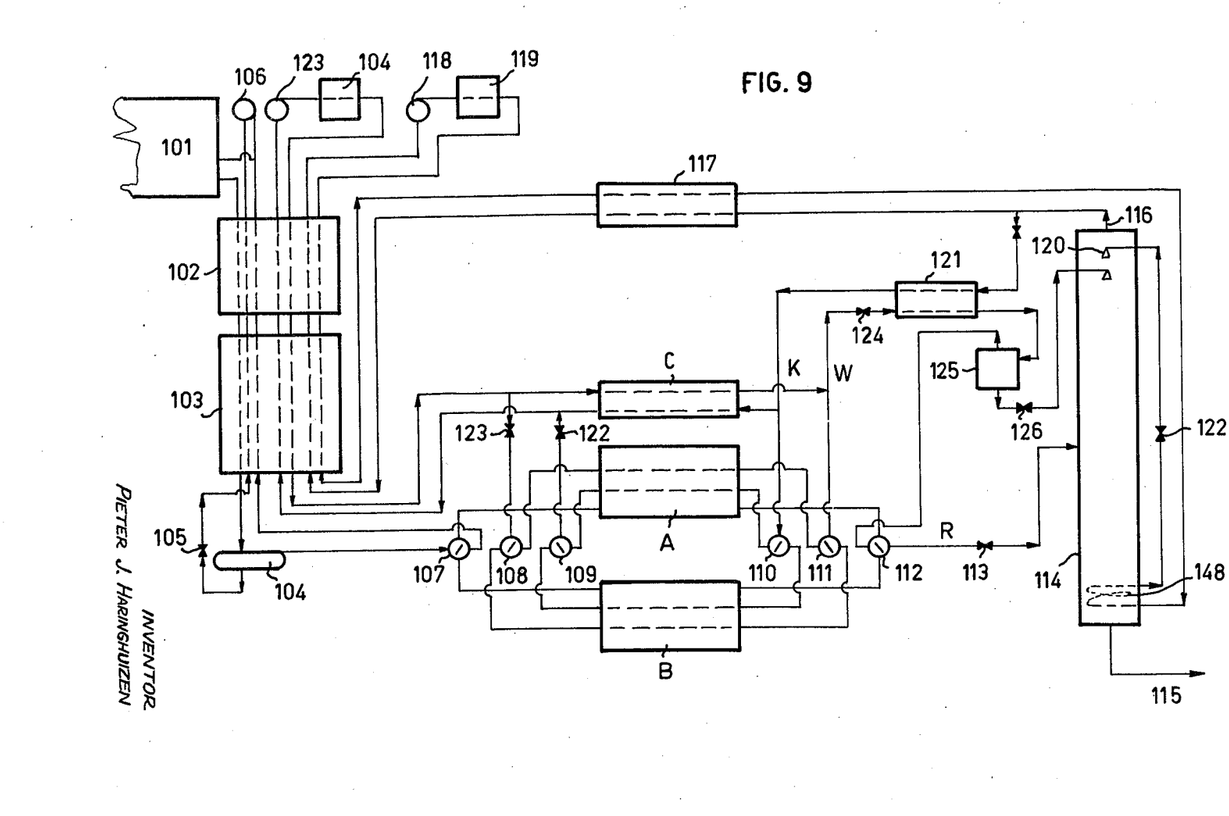
FIGURES 9, 10 and 11 are further diagrammatic views illustrating in more detail the apparatus of FIGURES 1, 2 and 6.
Figure 10:
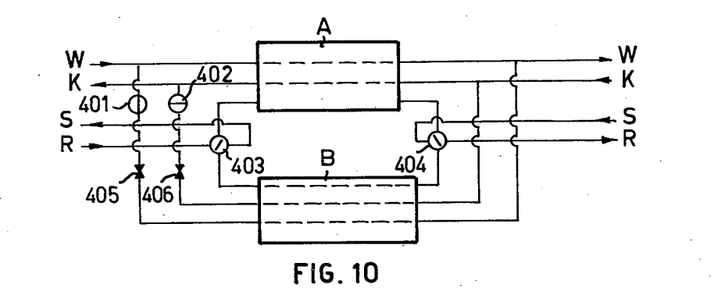
Figure 11:
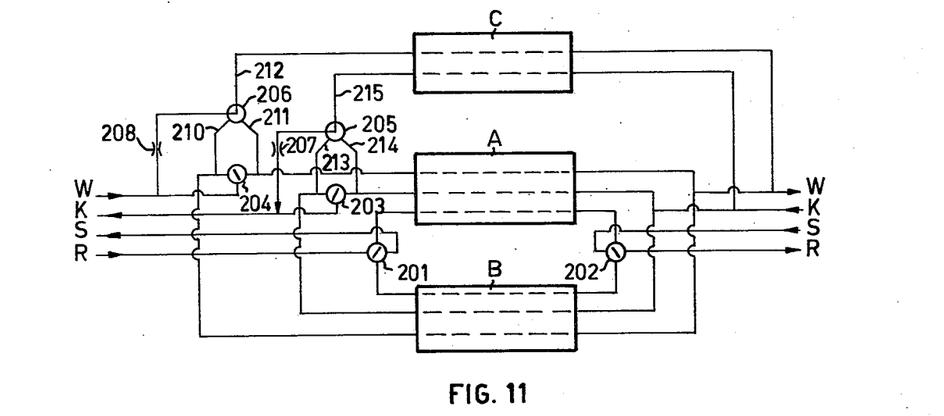

Various alternating flow systems according to the invention are shown in FIGURES 1, 2, 5 and 6. FIGURES 9, 10 and 11 show further details of the systems described in FIGURES 1, 2 and 6.

In the drawings A and B are the two reversible heat-exchanging regenerators and C is a third heat-exchanging element. R represents the gas to be cooled and purified, S the flushing gas, K the gas for cooling the gas to be purified and W the gas used for delivering heat to the regenerators during flushing.

It is assumed that the temperatures of K and S are the same and that the temperatures of W and R are likewise the same on entering the regenerators. This implies, moreover, that the temperature of K and S on entering the regenerator is some degrees lower than the temperature of W and R on leaving the cold side of said regenerators generally 2 to 5° C. lower. Likewise, the temperature of K and S on leaving the warm side of the regenerators is a few degrees lower e.g. 2 to 5° C., than the temperature of W and R on entering.

Figure 1A:
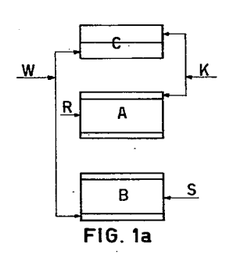
Figure 1B:
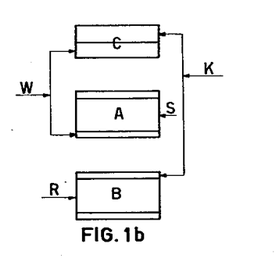

In the system depicted by FIG. 1, the object of the process, i.e., removal of the impurities at a temperature which on the average is higher than that at which the said impurities have been deposited, is achieved as follows:

The entire cycle may be regarded as subdivided into four periods the flow connections for the first two periods I and II being, for example, as shown in FIG. 1a and for the last two periods III and IV as shown in FIG. 1b.

In the first two periods the gas R to be cooled and purified flows through the heat-exchanging regenerator A in counter-current relation with the cold gas K with simultaneous deposition of impurities, while at the same time the cold flushing gas S flows in opposite direction and in counter-current relation with a warm gas W through the heat-exchanging regenerator B, where the impurities deposited in a previous period are in consequence evaporated again.

The quantities of the gases W and K are in excess to the quantities of the gases R and S. In the mean the quantities of the gases W and K and of the gases R and S are equal. The excess quantities of W and K not used for creating the fluctuation of the temperature in the regenerators A and B are flowing counter-currently through C.

During the first period a larger quantity of cold gas is passed through the regenerator A than is needed for cooling the gas R to such an extent that the temperature at any point of the regenerator remains constant, and at the same time the quantity of W flowing in heat-exchange relation with S through the regenerator B is increased correspondingly. In consequence, during the said first period, the temperature decreases in A at all points and increases in B, whereas the temperature in C at all points will remain constant.

During the second period correspondingly reduced quantities of W and K are passed through the regenerators A and B so that the temperature in A rises again and the temperature in B falls correspondingly, while the gases in C keep this heat-exchanger in thermal equilibrium.

Figures 3, 4:
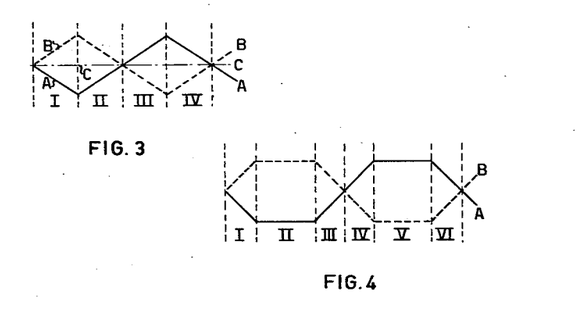
FIGURES 3, 4 and 7 indicate three different temperature patterns obtained in the regenerators by three different methods of temperature control.

When the temperatures at any point in A and B have ben restored to the temperatures prevailing at these points at the start of the cycle the gas flows to A and B are exchanged so that A is supplied as was B in the second period, and vice versa. Now in the third period the larger quantities of W and K flow through the regenerators A and B and in the fourth period the quantities of W and K flowing through A and B are reduced. In the result, the temperature at any points in the regenerators will vary over the cycle as shown in FIG. 3. In this graph the temperature at one point of each heat-exchanging regenerator is plotted on the vertical axis against time on the horizontal axis. During the periods I and II the gas R to be cooled is passed through A while during the periods III and IV the flushing gas is passed through. The deposition of the impurities consequently takes place at a lower average temperature than the evaporation of said impurities. Meanwhile the temperature in any point of the heat-exchanger C remains approximately constant, because the heat quantities of the gases flowing in counter-current relation through the heat-exchanger vary in the same proportion.

It will be clear that a similar effect can be produced by switching over in e.g. six periods instead of in four, in which case the heat quantities of K and W traversing the exchangers during the first and the fourth periods will be large enough to outweigh the effects of the heat quantities of R and S, be equivalent in effect to the heat quantities of R and S in the second and the fifth periods (in other words the temperatures at any points in the regenerators will remain unchanged during these periods) and will be small enough to be outweighed by the effects of the heat quantities of R and S during the third and sixth periods. The temperature at any points of the heat-exchanging regenerators will then vary for instance as shown in FIG. 4. Between periods III and IV the gas flows are exchanged. As is apparent from the graph, the periods need not be of the same length. The periods II and V, for instance, may be much longer than the other periods.

It may be observed here that even when the heat quantities of gas that are in heat-exchange relation with each other are perfectly equivalent, in the sense of delivering equal amounts of heat and cold to the regenerators, a truly horizontal temperature level cannot be maintained. There will always be a tendency to deviate toward the mean temperature line, which deviation is counteracted only by the high intrinsic thermal capacity of the heat-exchanging regenerator. If a perfectly horizontal temperature line should be required, it will be necessary to supply a small excess of the gas acting contrary to the direction of the deviation.

Figure 2A:
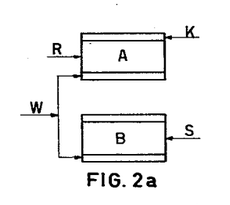
Figure 2B:
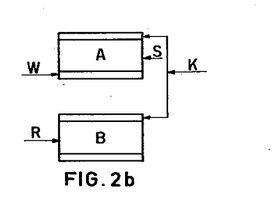

FIG. 2 shows a flow diagram in which no third heat-exchanger C is used. Here the heat-exchanging regenerator A has also assumed the task of the heat-exchanger C (in FIGS. 1a, 1b), because the quantities of K and W which in the previous embodiment were passed through C, are now made to flow through separate tube systems in A. The same variation in temperature may, however, be obtained in a similar way. If for example switching is done in four periods per cycle, the flow connections in the first two periods will be as shown in FIG. 2a and during the last two periods as shown in FIG. 2b. In the first period a larger heat quantity of W compared to S is passed through B, in the second period a smaller heat quantity of W, in the third period a larger heat quantity of K compared to R and in the fourth period a smaller heat quantity of K. The temperature in B will then rise during the first period, drop during the second and third periods and rise again during the fourth period. The temperature variation in A is just the reverse. During the first period there is an overall deficiency of W causing a drop in temperature, during the second period there is an excess of W causing a rise in temperature, during the third period there is a deficiency of K causing the temperature to keep on rising, and during the fourth period there is an excess of K causing the temperature at any point of the heat-exchanging regenerator A to drop again.

It will be noted that the heat quantities of W and K available for use in the system at any moment have to exceed the heat quantities which would balance off the heating and cooling effects of the gas R to be purified and the flushing gas S. The minimum quantities, for instance in the case of the flow diagram shown in FIG. 1, correspond with those employed during the periods when excess W and K is flowing through the regenerators A and B, assuming no gases to be simultaneously flowing through the heat-exchanger C.

Figure 5:
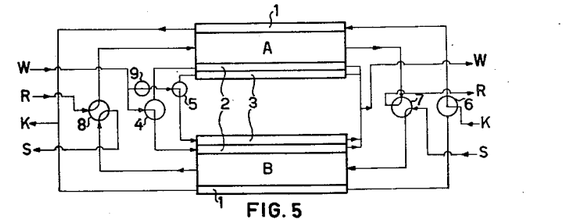

The adjustment of flow by valves in switching over from one period to the next, requiring alternate passage first of an excess quantity of a gas and then a deficient quantity of a gas in relation to another gas stream gives rise to certain difficulties in actual practice but it is advantageous to use for this purpose a combination of simple on-off valves, as, in connection with yet another possible arrangement according to the invention, is illustrated in FIG. 5.

In the system depicted in this diagram, two reversible heat-exchanging regenerators A and B are alone employed. These are provided with at least two separate tube systems. In the illustration three systems 1, 2 and 3 are indicated, but 2 and 3 may be one system.

An excess quantity of a cold gas K in relation to the quantity of gas R to be cooled and purified e.g. a 25% excess, and the same excess quantity of warm gas W, in relation to the quantity of flushing gas S are continuously supplied to the system. The stream of warm gas W is split up into two streams, the heat quantity of one of which is just as much smaller than the heat quantity of S as the heat quantity of stream K is larger than the heat quantity of R. The remaining heat quantity of W will be referred to hereafter as "extra W."

In the heat-exchanging regenerators tube system 1 is used for passing the cold gas K in counter-current relation with the gas R to be purified, the latter gas flowing through the free space in the regenerator.

The tube systems 2 and 3 serve for passing the two streams of warm gas W flowing through the regenerators in counter-current relation with the flushing gas S. The directions of the various streams are controlled by the three-way valves 4, 5 and 6 and by the four-way valves 7 and 8. The control valve 9 is used to adjust the quantity of gas which can flow through 5 when this is open.

In the situation as shown in the drawing the gas R to be purified flows via the valve 8 through the free space of the heat-exchanging regenerator A and issues through the valve 7. The cold gas K flows through the tube system 1 in counter-current relation with the gas R via the valve 6. Since the heat quantity of K is slightly greater than the stream of R to be purified, the temperature at any point of A will drop.

At the same time the flushing gas is passed via the valve 7 through the free space of the heat-exchanging regenerator B in counter-current relation with the warm gas W flowing through the tube systems 2 and 3 of B. The total heat quantity of this gas W is again greater than the heat quantity of the stream S, so that the temperature in any point of regenerator B rises slowly.

At the end of this first period the valve 5 is turned so that the stream of extra W is passed through A instead of through B. As a result, more heat is supplied to A than is discharged from it, and the temperature at any point of A consequently rises slowly. In B the the heat quantity of the stream of W flowing through the tube system 2 is now smaller than the heat quantity of S and the temperature at any point of B now falls.

When the temperature at any points of A and B has been restored to its mean value, the valves 8, 4, 7 and 6 are simultaneously turned, causing A and B to change places in relation to the gas flows, the regenerator A being switched to the flushing phase and B being switched to the loading phase. The stream of extra W is still flowing through A, so that now the total quantity of W is again in counter-current relation with S and the temperature in A rises during this third period. In B the temperature drops due to the excess heat quantity of K which can now again take full effect. Next, valve 5, is turned again, causing the temperature in A to drop and the temperature in B to rise. At the end of this period the temperatures in A and B are equal again, after which the valves are turned again into the positions shown in the figure. Naturally, the duration of each period is made so long that by the end of the period the free space in the regenerator through which the gas to be purified is passing is charged with deposit to an extent such that the resistance or the rate of heat-exchange just reaches the permissible limits.

In this arrangement to, where only the quantity of gas W flowing through each regenerator is varied during the cycle, it is of course possible to vary the profile of the temperature curve by a progressive variation of the supply of W over a part or the whole of the cycle. If the supply of extra W is varied, e.g., according to a sine function, the temperature at any point in both regenerators will also vary approximately as a sine function. The peaks of the temperature curve may be predetermined by means of the valve 9.

Figure 6:
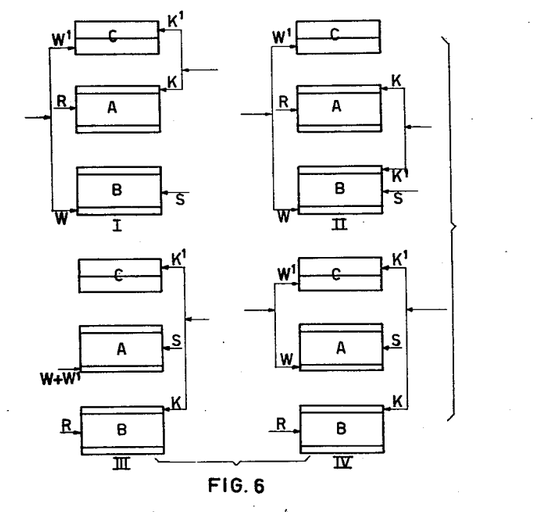
Figure 7:
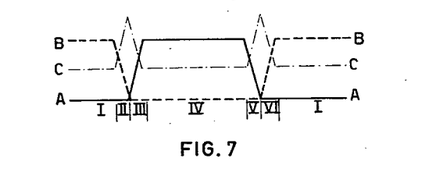

In the embodiment according to FIG. 1 described above employing a third heat-exchanging element, a normal heat-exchanger is used as this element. It is also possible to apply the invention using a third element having a high intrinsic thermal capacity and to utilize this high capacity in obtaining the required temperature effect. FIG. 6 shows diagrams of a system in which such a heat-exchanging regenerator is used as the third heat-exchanging element C. The figure shows the flow arrangement for four successive periods of the cycle. The gas stream $K^1$ and $W^1$ flowing through C are in this case considerably smaller than the main streams K and W which are in heat-exchange relation with the gas R to be purified and the flushing gas S. In FIG. 7 the variation in temperature for points in the regenerators A, B and C is plotted against time.

In period I, A is used for cooling and purifying the gas R; at the same time, B is cleaned by the flushing gas S. From FIG. 7 it can be seen that the temperature in A is lower than in B. This difference in temperature is so chosen that the removal of the impurities may be effected in a shorter period than is required for the deposition of the impurities from the gas R to be cooled. The heat-exchanger C has an average temperature lying between the temperatures of A and B.

When the time is reached for switching over the regenerators A and B because the resistance in A has reached the permissible limit while B is clean, first the stream $K^1$ is switched over from heat-exchanger C to regenerator B (period II). This causes the temperature in B to drop quickly, while the temperature in C rises correspondingly because the cold gas stream $K^1$ is no longer passed through it. When the regenerator B has cooled down to the temperature level in regenerator A, the streams are switched to the arrangement indicated by diagram III. Now B is traversed by the gas to be purified, flowing in counter-current relation with the cold gas K; A is traversed by the flushing gas flowing in counter-current relation with the warm gas stream W. Moreover, an extra stream $W^1$ is passed through A, causing the temperature in A to rise quickly, while the temperature in C will drop correspondingly owing to the stream $W^1$ being diverted. When A has reached the temperature required for flushing, $W^1$ is switched back to C as a result of which the temperature in A will further remain constant at the required high level. The situation shown in diagram IV is identical with that indicated in diagram I, save for the fact that A and B have changed places in relation to the gas flows. It will be clear that repetition o the same switchings, however, with A and B interchanged, will subsequently lead to the situation indicated by I, at which point the cycle is completed.

This scheme may also be varied in many ways. For example, by slightly altering the switching sequence the rise and fall of the temperatures in the regenerators A and B will take place during the period in which the impurities are deposited instead of during the flushing period.

Another possibility is to cut off only a part of the gas quantities flowing through C. Also, the heat quantities of gases flowing through the heat-exchanging elements during the periods I and IV may not be entirely equivalent so that sloping instead of horizontal temperature lines will be obtained in these periods.

In all of the above embodiments of the invention described with reference to FIGS. 1 to 7, heat quantities of the cooling and warming gas in excess of the heat quantities of the gas R to be purified and of flushing gas S are flowed to the system in each cycle. Such excess quantities will usually be available in practice if a distillation stage follows the cooling and purifying stages. The gases K and W then represent the reflux circuit for example, and are in larger quantities compared with the gas R to be distilled.

The invention described above may be used in a wide range of applications but is particularly suitable for cooling technical hydrogen which has to be distilled for recovering the deuterium contained in it.

In that case R is the technical hydrogen to be distilled, which with simultaneous separation of $N_2$ and CO and/or other impurities in liquid form, has been cooled to just above the melting point of said admixtures, e.g. 65° K., W is a warm hydrogen with the same temperature as R. S and K are hydrogen issuing from the distillation column and having a temperature of e.g. 25° K., S being the hydrogen which after taking up the impurities is returned to the hydrogen source. K forms with W the reflux circuit or a part of the reflux circuit of the distillation plant. The cold, expanded hydrogen of stream K is warmed to room temperature, compressed, cooled again and expanded, given the recess amount of cold necessary for the distillation plant.

A more detailed diagram of the apparatus utilized in FIGURE 1 is shown in FIGURE 9. In this diagram a cooling circuit not forming a part of the flushing circuit for the distillation plant is used. 101 is the source for the raw hydrogen, e.g. a plant for the production of ammonia. The raw hydrogen with a pressure of 10 atm., is cooled down in two heat exchangers 102 and 103. In exchanger 102 water, carbon dioxide and other impurities having a high condensation temperature is frozen out. In the second heat exchanger 103 the hydrogen is cooled down to about the freezing point of nitrogen 63° K. Here the nitrogen condenses in liquid form together with other impurities such as oxygen, carbon monoxide etc.

In vessel 104 the liquids are separated from the gas at a pressure of 10 atm. The liquid is expanded through the expansion valve 105 to a pressure of 1.5 atm., delivers its cold in the exchanger 103 and 102, is then compressed again to 10 atm. by pump 106 and in this way is pressed back in the stream of flushing gas coming from the plant.

The raw hydrogen, freed from the liquid impurities at a pressure of 10 atm. flows through the reversing valve 107, the heat exchanging regenerator A, where the impurities are cooled out in solid form at a temperature of between 63° K. and 32° K., reversing valve 112 and expansion valve 113 where it is expanded to a pressure of 1.3 atm. and then goes to the distillation tower 114 maintained at 22° K.

Here the hydrogen at a pressure of 1.3 atm. is separated into a deuterium enriched hydrogen leaving the bottom of the tower at 115 and a deuterium poor hydrogen at the top of the tower. The top product, expanded hydrogen at a pressure of 1.3 atm. and a temperature of 22° K. is partly used as a reflux and partly as cold gas for cooling the raw hydrogen.

The reflux portion of the hydrogen passes heat exchangers 117, 103 and 102, is compressed with pump 118 to 3 atm., cooled in cooler 119 to 293° K. and then cooled down again by flowing in reversed direction through the heat exchangers 102, 103 and 117 to 26° K. This stream is used for heating the bottom of the distillation column at 148, then expanded to the pressure of the column 1.3 atm. in the expansion valve 129 and sprinkled in the top of the column at 120.

The second part of the hydrogen coming from the top of the column at 116 at a pressure of 1.3 atm., and a temperature of 22° K. gives some of its cold in heat exchanger 121, flows partly, e.g. 90% by volume via reversing valve 110 through heat exchanging regenerator A, reversing valve 109, valve 122, and partly e.g. 10% by volume, through the heat exchanging element C and after combination of the two streams through heat exchangers 103 and 102 to pump 123, where the mixture is compressed to 100 atm. The compressed hydrogen passes cooler 124 where it is cooled to 293° K. and is cooled down again in the heat exchangers 102 and 103 to about 65° K. The temperature is then again the same as the temperature of the raw hydrogen before entering either of the heat exchanging elements A or B. The compressed hydrogen is partly, e.g. 10%, led through heat exchanging element C, partly, e.g. 90%, via reversing valve 108 through the tubes of the heat exchanging regenerator B, where it flows counter currently with the flushing gas through B. The compressed hydrogen which has now cooled down passes reversing valve 111, is recombined with the compressed hydrogen stream through C and expanded to 10 atm. in expansion valve 124. The combined streams have a temperature of 32° K. In heat exchanger 121 cold is taken up from the hydrogen serving as cold gas for the cooling of the raw hydrogen. Condensed hydrogen is separated from the recombined hydrogen gas in the separator 125, the liquid hydrogen being further expanded in expansion valve 126 to a pressure of 1.3 atm. and led into the top of the distillation column. The gaseous hydrogen with a pressure of 10 atm. and a temperature of 32° K. coming from separator 125 is used as flushing gas for the purging of the regenerator B via reversing valve 112.

The hydrogen now having a temperature of about 61° K., and contaminated with impurities flows via reversing valve 107 and heat exchangers 103 and 102 back to the hydrogen source after having taken up the nitrogen etc. cooled out in liquid state in the regenerator.

The cycle illustrated by FIGURES 1a and 1b of the drawings is performed as follows. The valves 107, 108, 109, 110, 111, 112 are positioned as necessary for the scheme of FIG. 1a. Regenerator B is purged. In regenerator A raw hydrogen is purified. The variation in the flow of the gas W is performed by varying the resistance in the passage to the regenerators by means of valve 123. At the same time the resistance in the passage for the cold gas is varied by means of valve 122. This variation in the flow of the gases by varying the resistance by means of valve 122 or 123 is only possible if the passage through C has enough resistance. Otherwise a fixed or variable resistance must be incorporated in the passages, through C.

Reversing the position of valves 107, 108, 109, 110, 111 and 112 gives the siuation of FIG. 1b. The temperature drift is achieved again by varying the resistance of valves 123 and 122.

In carrying out the invention as illustrated in FIGURE 9 the flushing gas and the raw hydrogen have the same pressure. This is preferred since the switching of the gas streams imparts no shock to the system.

However, it is also possible to use a gas of a different pressure in the flushing stage. In such case the circulation diagram can be simplified by utilizing the reflux system instead of the high pressure circuit. Part of the gas from the top of the distillation column is fed directly through heat exchanger C and one of the regenerators A and B. It is compressed to a somewhat higher pressure, e.g., 10 to 40 atm. in order to be able to deliver the cold necessary in the circuit and brought back through C and one of the regenerators A and B, serving as gas W. After combination of the two portions the gas is used as reflux.

In such modification of the process the other part of the hydrogen from the top of the column is used as flushing gas. It is fed from the top of the column directly to a reversing valve 112. The purging is done in a gas with a pressure of 1.5 atm.

In FIGURE 10 the valves 401, 402, 403 and 404 are positioned as necessary for the flow of gases as shown in FIG. 2a. Turning these valves give the situation of FIG. 2b. Valves 405 and 406 are regulating valves by which the flow of the gas through these valves can be varied in order to achieve the temperature drift. The sources of W, K, S and R are the same as in FIGURE 9.

In FIG. 11 the position of the valves 201, 202, 203, 204, 205 and 206 correspond with phase I of FIGURE 6. The valves 205 and 206 are designed to give connection between the inlet of the gas W and the pipes 210, 211 or 212 as desired and the outlet of gas K and the pipes 213, 214 or 215 as desired. By turning valve 205 so that the connection with pipe 213 is made the flow of the gases as is shown in FIGURE 7II. By turning valves 201, 202, 203 and 204 at the same moment, turning valve 205 back to its first position and valve 206 so that the connection with pipe 211 is made the situation in FIGURE 7III is achieved. Turning back valve 206 to its original position gives the situation in FIGURE 7IV. The balance of the cycle can be made as follows:

Turning valve 205 so that the connection with pipe 214 is made, results in the position of FIGURE 7V. Then by turning the reversing valves 201, 202, 203 and 204 in their original positions (as in FIGURE 7I) turning back valve 205 to its original position and positioning valve 206 so as to give connection with 210 the stage of FIGURE 7VI is attained. By turning back valve 206 the position of FIGURE 7I is again reached.

207 and 208 are restrictions by which the amount of gas W and K are limited as desired.

It is also possible that the streams K and W form together a separate circuit for cooling purposes not directly connected with the hydrogen to be or being distilled.

I claim:

1. A process for the purification of hydrogen containing nitrogen as an impurity by a heat exchanger system comprising continuously flowing the impure hydrogen first through one and then through the other alternately of two reversible heat exchanging regenerators, simultaneously continuously flowing a cold flushing gas, said cold flushing gas being at least partially composed of purified hydrogen which has been compressed and subsequently expanded, through the regenerators alternately in reverse direction whereby each regenerator is alternately traversed by impure hydrogen and then by said flushing gas, countercurrently flowing a separate gas colder than the impure hydrogen through said regenerators in heat exchange relation with the space traversed by the impure hydrogen, said separate colder gas being hydrogen obtained by distillation of purified hydrogen, to cause deposition of the impurities, countercurrently flowing a gas warmer than the flushing gas through the regenerators in heat exchange relation with the space traversed by the flushing gas, said warmer gas being purified hydrogen after compression, to cause the impurities to be evaporated and removed by the flushing gas, regulating the amounts of said separate colder gas and said warmer gas flowing through each regenerator so that in each complete cycle there is a deposition of impurities and a subsequent evaporation stage in which the average temperature at any place in the regenerator during the evaporation is higher than the average temperature in the regenerator at that place during deposition, the quantities of the said separate colder and warmer gases available during the course of a cycle for forming said streams, reckoned in terms of total heat capacity, being respectively in excess of the quantities of impure hydrogen and flushing gas passing to the system per cycle, and achieving the required average temperature difference between the deposition and evaporation stages by variably depriving the regenerators in the course of a cycle of fractions of the full available quantities of said colder and warmer gases and by variably supplying an amount of the colder gas to deliver cold to a regenerator which is being flushed and variably supplying an amount of the warmer gas to deliver heat to a regenerator in which nitrogen impurity is being deposited.

2. A process for the purification of a gas by a heat exchanger system comprising continuously flowing the gas to be purified first through one and then through the other alternately of two reversible heat exchanging regenerators, simultaneously continuously flowing a cold flushing gas through the regenerators alternately in reverse direction whereby each regenerator is alternately traversed by impure gas and then by flushing gas, countercurrently flowing a separate gas colder than the gas to be purified through said regenerators in heat exchange relation with the space traversed by the gas to be purified to cause deposition of the impurities, countercurrently flowing a gas warmer than the flushing gas through the regenerators in heat exchange relation with the space traversed by the flushing gas to cause the impurities to be evaporated and removed by the flushing gas, regulating the amounts of said separate colder gas and said warmer gas flowing through each regenerator so that in each complete cycle there is a deposition of impurities and a subsequent evaporation stage in which the average temperature at any place in the regenerator during the evaporation is higher than the average temperature in the regenerator at that place during the deposition, the quantities of the said separate colder and warmer gases available during the course of a cycle for forming said streams, reckoned in terms of total heat capacity, being respectively in excess of the quantities of impure gas and flushing gas passing to the system per cycle, and achieving the required average temperature difference between the deposition and evaporation stages by variably depriving the regenerators in the course of a cycle of fractions of the full available quantities of said colder and warmer gases and by variably supplying an amount of the colder gas to deliver cold to a regenerator which is being flushed and variably supplying an amount of the warmer gas to deliver heat to a regenerator in which impurity is being deposited, said required average temperature difference between the deposition and evaporation stages being achieved by flowing excess quantity of the colder gas in at least one stream in countercurrent heat exchange relation with the impure gas, flowing in countercurrent heat exchange relation with the flushing gas at least one stream of the warmer gas, and varying the quantity of warmer gas in the said stream in each stage by switching part of the warmer gas during one stage from flow in heat exchange relation with the flushing gas to flow in heat exchange relation with the impure gas and switching said part back again in the next stage.

References Cited in the file of this patent

UNITED STATES PATENTS

| | | |
|---|---|---|
| 1,842,263 | Gobert | Jan. 19, 1932 |
| 2,496,380 | Crawford | Feb. 7, 1950 |
| 2,534,478 | Roberts | Dec. 19, 1950 |
| 2,622,416 | Ogorzaly | Dec. 23, 1952 |
| 2,663,167 | Collins | Dec. 22, 1953 |